Jan. 1, 1946.  J. MERCIER  2,392,173
METHOD OF MAKING ACCUMULATOR BAGS
Filed Sept. 24, 1943  2 Sheets-Sheet 1
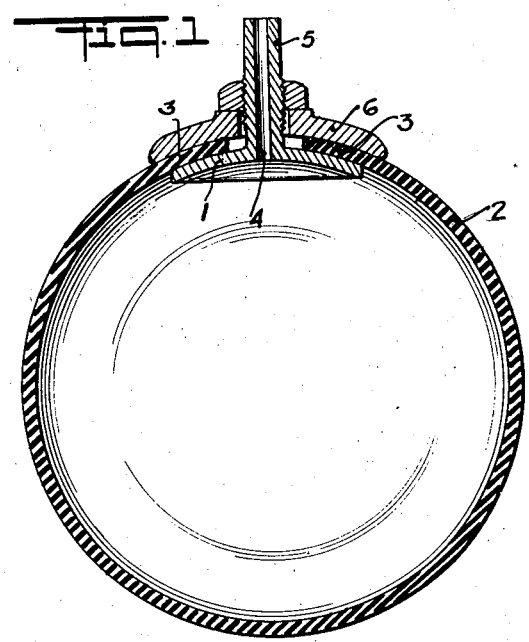
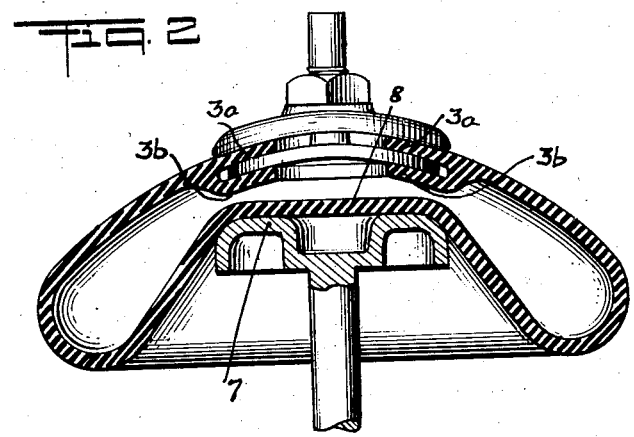
INVENTOR.
Jean Mercier
BY
ATTORNEY

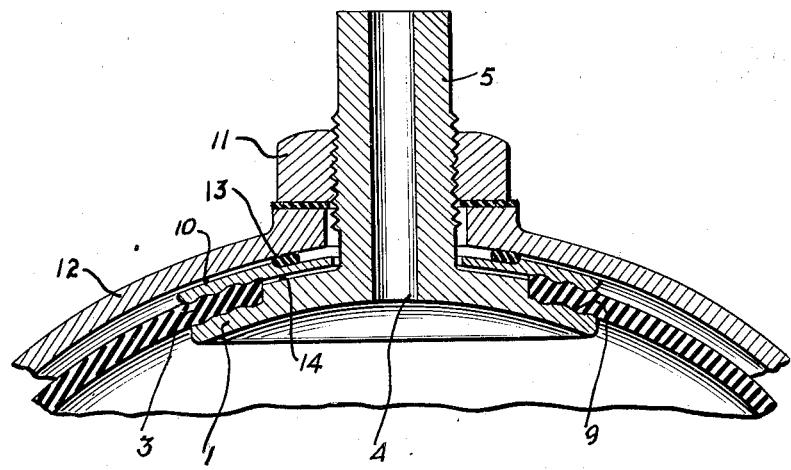
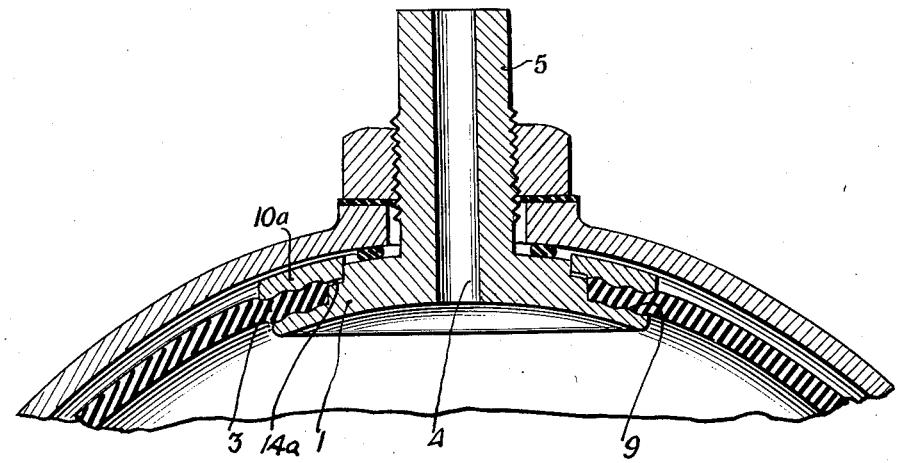

Patented Jan. 1, 1946

2,392,173

UNITED STATES PATENT OFFICE 2,392,173

METHOD OF MAKING ACCUMULATOR BAGS

Jean Mercier, New York, N. Y.

Application September 24, 1943, Serial No. 503,625

5 Claims. (Cl. 18—53)

This invention is related to a method of making balloon type rubber bags and more particularly to a method of making a bag which is suitable to insert in a hydraulic accumulator and which is comprised of natural or synthetic rubber compositions.

Bags of this type have been manufactured heretofore by moulding and vulcanizing, at least two separate portions of the bag and by cementing said portions together.

According to the present invention, the bag may be prepared in one piece. Accordingly, the bag is provided with a large opening to permit the removal of the mould which was inserted for the purpose of forming and vulcanizing the same.

During the first step in the manufacture of the bag, i. e. the forming and vulcanizing of the same, an annular portion adjacent the large opening is not vulcanized.

A metallic valve member with a base portion shaped as a disc with suitable dimensions is inserted through the large opening in the bag and drawn up against the portion not vulcanized during the first step of manufacture. It is then joined to the bag by vulcanizing the said unvulcanized portion to the rim portion of said disc.

In another modification, the bag portion adjacent the opening is slit and the rim portion of the disc is inserted into the slit portion so as to be sandwiched between two layers of the material of which the bag is made, after which it is vulcanized.

In a still further modification, a metallic valve member with a base portion shaped like a disc having suitable dimensions is inserted through the large opening in the bag, and a disc shaped washer is placed over the stem of the valve member so that it bears on the outer surface of the bag around the periphery of the large opening. The inserted disc like base portion is drawn against the inner surface of the bag around the periphery of the large opening and the unvulcanized section of the bag around the opening is then vulcanized to both metallic disc members.

The particular manner of securing the plate to the bag will be apparent from the following description of the embodiments of the present invention which are illustrated in the accompanying drawings.

Fig. 1 is a cross sectional view of a bag and a valve disc applied thereto, showing the mould in position for vulcanizing;

Fig. 2 is a cross sectional view illustrating an alternative method of joining bag and valve disc together;

Fig. 3 is another cross sectional view of another method of joining the bag and the valve disc; and Fig. 4 is another cross sectional view of the valve disc and bag similar to Fig. 3.

In Fig. 1 the circular disc 1 is shown inserted in a bag 2. Disc 1 is also curved in accordance with the curvature of the container into which it is to be inserted with the bag 2.

Disc 1 is formed as the base of a valve with a stem 5 and a central passage 4.

Bag 2 has been formed and vulcanized in conventional manner in a first step of manufacture, except that the opening or mouth has not been thoroughly vulcanized and said opening has been provided large enough to withdraw the mould used.

The opening in bag 2 is formed in the same shape as disc 1 but of somewhat smaller cross sectional dimensions, so that a portion 3 of bag 2 is overlapping disc 1. The area of contact between portion 3 and the disc has to be chosen in proportion to the pressure to which bag 2 is to be inflated. Portion 3 of bag 2 is not thoroughly vulcanized during the first step of manufacture this may be done by applying a retarding agent, such as non-vulcanizing cement, or may be accomplished by supplying less heat to this area, or, at least, not completely.

In bonding the rubber to the disc a suitable amount of a conventional accelerator such as sulphur is added to portion 3, and disc 1 is then inserted into bag 2 and drawn up to the position shown in the drawings.

A vulcanizing mould 6 which may be guided by tube 5 is then positioned as indicated in Fig. 1, so as to force portion 3 of bag 2 against the bonding portion of disc 1. Mould 6 is heated and this heat is transmitted through tube 5 to disc 1 to vulcanize or bond these parts together.

In another modification illustrated in Fig. 2 the portion around the periphery of the opening in the bag is split into two portions 3a and 3b. The rim portion of disc 1 is inserted between portions 3a and 3b and the latter are then secured to the former by vulcanization thereon, in a similar fashion to that described above, except that in order to vulcanize portion 3b, a mould 7 is applied against portion 8 of bag 2 to press the same against disc 1, whereby the necessary pressure is exerted on portion 3b.

It is generally sufficient to heat mould 6 in order to vulcanize portions 3a and 3b, but in some cases to accelerate the operation mould 7 is also heated.

In any case, while portion 3b is vulcanized, portion 8, too, will suffer a certain additional vulcanization. This additional vulcanization will be very noticeable when mould 7 is heated. Accordingly, care must be taken during the first step of manufacture to vulcanize portion 8 to such a degree only that both vulcanizations of portion 8 together; i. e., the preliminary vulcanization during the first and the additional vulcanization during the second step of manufacture, produce the total desired degree of vulcanization. This effect can be easily obtained by an appropriate choice of the amount of accelerator during the first step of manufacture.

In a further modification illustrated in Figs. 3 and 4 the portion 9 of the disc 1 is formed with a rough gripping surface and in like manner the portion 3 is vulcanized thereto, but in addition a washer 10 is placed over the stem 5 and brought down on the exterior surface of the bag. The inner surface of the washer 10 is also formed with a rough gripping area which bears on the rubber. When the bag is vulcanized it is bonded to both the disc 1 and the washer 10.

When the accumulator is assembled, nut 11 is tightened until the accumulator shell 12 presses washers 10 (Fig. 3) or 10a (Fig. 4) firmly against shoulders 14 or 14a, whereby bag portion 3 is firmly clamped between the washer and the shoulder. A suitable seal 13 is inserted between shell 12 and stem 5.

When it is desired to make the hole or mouth of the bag relatively small with respect to the mould which has to be used in the first step of manufacture, a difficulty is sometimes observed because portion 3 (or 3a or 3b) is injured during the removal of said mould. To avoid that risk it is, then, advantageous to at least partly vulcanize the interior peripheral part of portion 3; i. e., the part immediately adjacent the hole, during the first step of manufacture of the bag. This will provide an annular rim portion of bag 2 having such resistance and resilience that the mould can be easily withdrawn. There remains, of course, always an unvulcanized area intermediate between said rim portion and the main body of bag 2 which may be vulcanized during the second step of manufacture on to the disc 1. This expedient to facilitate the removal of the mould will impair the bonding of the aforesaid rim portion to disc 1, but the said intermediate area which is vulcanized on disc 1 will firmly adhere thereto; this manner of securing bag 2 is perfectly sufficient, particularly when the same is mounted as shown in Figs. 3 and 4.

The foregoing description is not intended to limit the present invention which extends to all changes, modifications and equivalents within the scope of the appended claims.

What is claimed is:

1. A method of making bags for hydraulic accumulators which comprises the first step of forming and vulcanizing a bag of rubber like material, while providing an opening in said bag large enough to withdraw the mould required inside said bag during said first step and leaving the area adjacent said opening in a partial state of vulcanization, the second step of applying a metal disc of larger dimensions than said opening against the interior of said bag so that the rim portion of said disc is in contact with said area and vulcanizing said portion of said bag to said portion of said disc on said portion.

2. A method of making bags for hydraulic accumulators which comprises the first step of forming and vulcanizing a bag of rubber like material, providing an opening in said bag large enough to withdraw the mould required inside said bag during said first step, and leaving the area adjacent said opening in a partial state of vulcanization, forming said area adjacent said opening into two lip portions which form an annular slot between them, the second step of applying a metal disc of larger dimensions than said opening, but not greater than the diameter of said annular slot, into the said bag so that the rim portion of said disc is engaged in said slot, and vulcanizing said lip portions of said bag to said rim portions of said disc.

3. A method according to claim 2 in which during said first step, the area of said bag corresponding to and opposite said opening and said first mentioned area is also left in an incomplete state of vulcanization, the vulcanization of said second mentioned area being completed during said second step simultaneously with the vulcanization of said two bag lip portions.

4. A method of making bags for hydraulic accumulators which comprises the first step of forming and vulcanizing a bag of rubber like material, providing an opening in said bag large enough to withdraw the mould required inside said bag during said first step, and leaving the area adjacent said opening in a partial state of vulcanization, applying a metal disc of larger dimensions than said opening to the interior surface of said bag adjacent to the opening and applying a metal washer to the exterior of said bag adjacent to the said opening.

5. A method of making bags for hydraulic accumulators which comprises the first step of forming and vulcanizing a bag of rubber like material, providing an opening in said bag large enough to withdraw the mould required inside said bag during said first step, and leaving the area adjacent said opening in a partial state of vulcanization, applying a metal disc having a rough gripping face to the interior of said bag adjacent said opening and applying a metal washer having a rough gripping face to the exterior of said bag adjacent said opening.

JEAN MERCIER.